(12) United States Patent
Dammann

(10) Patent No.: US 7,640,092 B2
(45) Date of Patent: Dec. 29, 2009

(54) DATA GENERATION AND TRANSMISSION SYSTEM IN AGRICULTURAL WORKING MACHINES

(75) Inventor: Ludwig Dammann, Harsewinkel (DE)

(73) Assignee: CLAAS Selbstfahrende Enrtemaschinen GmbH, Harsewinkel (DE)

( * ) Notice: Subject to any disclaimer, the term of this patent is extended or adjusted under 35 U.S.C. 154(b) by 627 days.

(21) Appl. No.: 11/291,833

(22) Filed: Dec. 1, 2005

(65) Prior Publication Data

US 2006/0155449 A1    Jul. 13, 2006

(30) Foreign Application Priority Data

Dec. 17, 2004    (DE) .................. 10 2004 061 439

(51) Int. Cl.
  *A01D 45/00*    (2006.01)
  *G08C 17/00*    (2006.01)
(52) U.S. Cl. ....................................... 701/50
(58) Field of Classification Search ............ None
  See application file for complete search history.

(56) References Cited

U.S. PATENT DOCUMENTS

| | | | |
|---|---|---|---|
| 3,659,568 A | 5/1972 | Howe | |
| 5,312,299 A | 5/1994 | Behne et al. | |
| 6,591,145 B1 * | 7/2003 | Hoskinson et al. | ............ 700/28 |
| 2004/0104623 A1 * | 6/2004 | Nakano et al. | ................ 310/12 |
| 2005/0237169 A1 * | 10/2005 | Niemann | .................... 340/438 |
| 2006/0136101 A1 * | 6/2006 | Spengler | ........................ 701/2 |

FOREIGN PATENT DOCUMENTS

| | | |
|---|---|---|
| DE | 1 961 803 | 6/1971 |
| DE | 41 33 976 A1 | 4/1993 |

* cited by examiner

*Primary Examiner*—Michael J. Zanelli
(74) *Attorney, Agent, or Firm*—Michael J. Striker

(57) ABSTRACT

A data generation and transmission system in agricultural working machines for exchanging data between mobile working units and/or stationary working units, and actuators includes data generation and transmission elements assignable to at least a portion of the working units, at least a portion of the data generation and transmission elements enabling wireless exchange of data, and an energy required for dealing with generating the data and/or transmitting the data, is associated with the data generation and transmission system so as to produce the data in the data generation and transmission system and/or transmit the data by the data generation and transmission system.

20 Claims, 5 Drawing Sheets

DATA GENERATION AND TRANSMISSION SYSTEM IN AGRICULTURAL WORKING MACHINES

CROSS-REFERENCE TO RELATED APPLICATIONS

This application claims priority under 35 U.S.C. 119(a)-(d) to German Patent Application Number DE 10 2004 061 439.3, filed Dec. 17, 2004.

BACKGROUND OF THE INVENTION

The present invention relates to a data generation and transmission system in agricultural working machines.

An agricultural working machine designed as a combine harvester to which a remote-controlled system for switching, operating and controlling working units and actuators is assigned is made known in publication DE 196 18 033. To enable uncomplicated signal transmission between the various elements of the switching and control device, wireless data transmission was selected instead of wire-based signal transmission. So that the signals transmitted to the most diverse actuators can now also trigger control and regulating processes, it is provided that the energy supply to the data exchange system be provided by centralized or decentralized energy accumulators, such as batteries. Embodiments of this type have the disadvantage, in particular, that a large number of smaller battery units must be assigned directly to the particular sensor elements, resulting in data exchange systems that are complex in design and expensive. On the other hand, the assignment of a centralized energy source has the disadvantage that long transmission paths require high transmission efficiencies that often cannot be easily transmitted across the distances to be covered in an agricultural working machine.

In contrast, systems with wire-based data transmission, such as that disclosed in DE 41 33 976, are widespread. Data exchange systems of this type have a high level of functional reliability, so that a loss of information due to the data exchange system is nearly negligible due to transmission of electrical energy that is easy to realize. This type of data transmission has various disadvantages, however, due to the fact that it must be connected to wire systems. For instance, the wiring networks require installation space, which is that much larger in size the more elements there are connected to the data exchange system. On the other hand, agricultural working machines have a large number of working units, so that the lines that ensure data exchange are exposed to a great deal of wear when the sensor elements are located directly next to movable components. To counteract this wear, the wiring systems have connecting elements for the mobile sensors that are complex in design and often very expensive, the elasticity of which reduces the risk of breakage.

SUMMARY OF THE INVENTION

It is therefore the object of the present invention to provide a data generation and transmission system in agricultural working machines that prevents the disadvantages of the related art described, has a great deal of flexibility, in particular, in adapting to geometric circumstances, and that is largely independent of separate energy accumulators.

In keeping with these objects and with others which will become apparent hereinafter, one feature of the present invention resides, briefly stated, in a a data generation and transmission system in agricultural working machines for exchanging data between working units selected from the group consisting of mobile working units, stationary working units, and both, and actuators, the data generation and transmission system comprising data generation and transmission elements assignable to at least a portion of the working units, at least a portion of said data generation and transmission elements enabling wireless exchange of data, and an energy required for dealing with the data selected from the group consisting of generating the data, transmitting the data, and both, being associated with the data generation and transmission system in a manner selected from the group consisting of producing the data in the data generation and transmission system, transmitting the data by the data generation and transmission system, and both.

Due to the fact that at least a portion of the data generation and transmission elements realizes wireless data exchange and the energy for generating data and/or for transmitting data is produced in the data generation and transmission system and/or is transmitted by the same, it is ensured that the data transmission can be adapted flexibly to geometric circumstances and functions largely independently of separate energy sources.

A cost-effective structure for the data generation and transmission system having a high level of functional reliability results when the information-gathering sensors are assigned to the working units and/or the actuators of the agricultural working machine that enable, via "transponders", communication of the sensors with at least one transceiver mounted on the frame. In this manner it is ensured that only the devices that are absolutely required to generate the particular data signals are located on the movable working units or actuators, by way of which the energy required directly at the movable working units and actuators to generate data or to realize an actuating procedure is limited.

In an advantageous further development of the present invention, the sensor(s) and the transponders assigned to them, and the at least one transceiver mounted on the frame are designed such that the signals generated by the sensors are transmitted to the particular transceiver without loss of data and, conversely, that data to be transmitted from the transceiver to the sensors are transmittable without loss.

An embodiment of the present invention that is cost-effective and that further reduces the installation space required results when a transponder is directly assigned to each sensor and a plurality of sensor-transponder systems communicate with the same transceiver.

To keep the susceptibility of the data generation and transmission system minimal, in an advantageous embodiment of the present invention, the sensor and the transponder assigned to it are combined in one sensor unit.

In an advantageous further embodiment of the present invention, a large number of sensors and the transponders assigned to them can be combined into groups of data generation and transmission elements, each group communicating with a separate transceiver. This has the advantage that the data transmission can be limited to distances that do not result in a loss of information. It is also thereby ensured that the energy requirement within these groups of data generation and transmission elements remains low.

Due to the fact that the transceiver(s) communicate with at least one control and evaluation unit and/or a bus system of the agricultural working machine, a more reliable and faster exchange of data with the further communication devices of the agricultural working machine is also ensured.

A particularly compact embodiment of the present invention that takes up little installation space and is minimally susceptible results when the energy source for the data exchange is the sensor-transponder system and/or the at least one transceiver.

A particularly small design of the sensor-transponder system is attained by obtaining the energy required to operate the sensor-transponder system from the transceiver signal.

In an advantageous embodiment of the present invention, the energy required to operate the data generation and transmission system can also be generated using external magnetic fields.

A low energy loss and, therefore, prevention of interferences in the data generation and transmission system become possible when the sensor-transponder system (and/or the transceiver) is movably located, and a pendulum-inductance coil system is located in the sensor-transponder system (and/or the transceiver) to produce energy.

In an advantageous embodiment of the present invention, the transceiver(s) are located in a fixed position on the machine frame of the agricultural working machine, while one or more sensor-transponder systems are fixed directly to the movable working units and/or actuators of the agricultural working machine. This has the advantage that the masses moved in the data generation and transmission system and the energies to be transmitted are low.

A high level of flexibility with regard for the information that can be exchanged using the data generation and transmission system is obtained when the sensors can generate measured signals and actuating signals.

Due to the fact that the agricultural working machine is designed as a combine harvester and the sensors are designed as grain sensors known per se and are assigned to the tray-type shaker and/or the cleaning device of a combine harvester, a data generation and transmission system for a combine harvester is provided that enables convenient data generation in areas that are difficult to access and are moved during operation. The same applies when the sensors are designed as actuating elements for the adjusting device of the sieve of the cleaning device.

In an advantageous further embodiment of the present invention, a large number of sensors, e.g., sensors known per se for determining wind speeds, crop moisture and temperatures, position sensors, grain-quantity sensors and rotational speed and torque sensors can be assigned to one or more working units of the agricultural working machine, so that the data generation and transmission within an agricultural working machine becomes largely independent of wire-based data transmission systems and separate energy sources.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
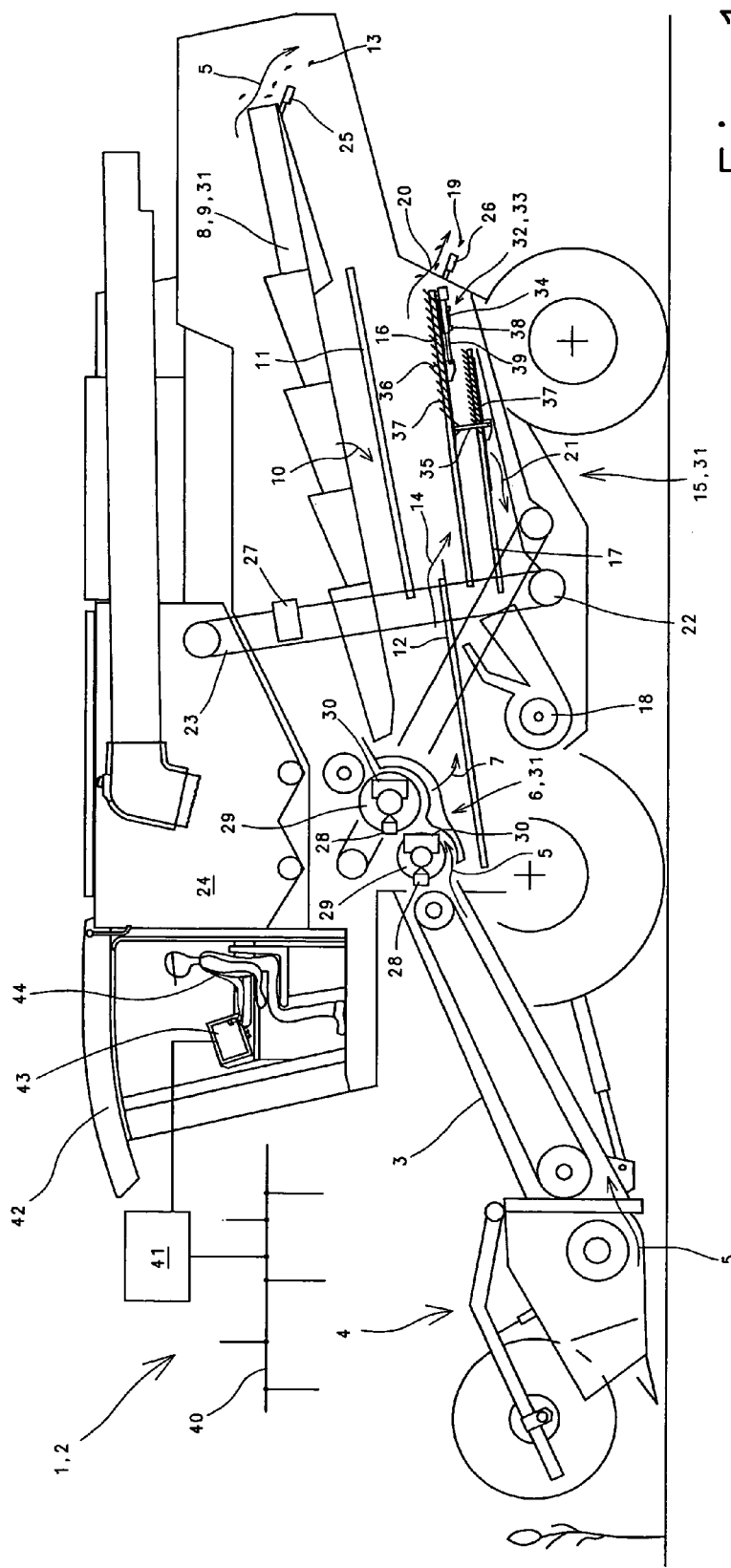
FIG. 1 shows a side view of an agricultural working machine designed as a combine harvester

An agricultural working machine 1 designed as a combine harvester 2 is shown in FIG. 1, in the case of which a cutting mechanism 4 is assigned to feed rake 3 located on the front side. In a manner known per se, feed rake 3 transfers crop flow 5, harvested by cutting mechanism 4, to threshing parts 6 in its rear region, where a first partial crop flow 7 consisting substantially of grain, non-threshed ears, short straw and chaff is discharged. In the rear region of threshing parts 6, the remaining crop flow 5 reaches a separating device 9 designed as a tray-type shaker 8, in the underside region of which a further partial crop flow 10 also consisting substantially of grain, non-threshed out ears, short straw and chaff is discharged. While partial crop flow 10 discharged at tray-type shaker 8 is directed via a return pan 11 to grain pan 12, first partial crop flow 7 discharged at threshing parts 6 reaches grain pan 12 directly. In the rear region of tray-type shaker 8, crop flow 5 composed essentially of straw and a small portion of residual grain—the losses due to separation 13—are discharged out of combine harvester 2.

Partial crop flows 7, 10 that reach grain pan 12 are transferred as combined crop flow 14 to cleaning device 15 located downstream of grain pan 12. In a manner known per se, cleaning device 15 is composed of cleaning sieves located such that they extend vertically and are spaced relative to each other, upper sieve 16 and lower sieve 17, and at least one cleaning fan 18 that moves a stream of air through the sieve systems 16, 17. Sieve system 16, 17, which is usually moved in a swinging manner and through which air flows, separates crop flow 14 transferred to it via grain pan 12 into substantially grain and non-grain components. In the rear region of cleaning device 15, a stream of material 20 consisting mainly of short straw and chaff and a small portion of grain—the losses due to cleaning 19—are discharged out of combine harvester 2.

A further grain flow 21 passing through sieve systems 16, 17 that is composed substantially of grain and, to a small extent, of admixtures of grain flow 21 is directed in a manner known per se using a feed auger system 22 and a grain elevator 23 to a grain tank 24 for storage of grain flow 21.

To determine grain-loss flows 13, 19, grain-loss sensors 25, 26 are assigned to separating device 9 designed as tray-type shaker 8 and cleaning device 15, in the rear region in each case, in a manner to be described in greater detail. In addition, grain elevator 23 that conveys grain flow 21 into grain tank 24 has a grain-quantity sensor 27 for determining grain quantity 21 that is harvested. It should also be mentioned here that a large number of additional sensors, such as sensors 28 for determining the rotational speed of cylinders 29 that are threshing parts 6, or sensors for determining a torque on cylinders 29 that corresponds to crop-material throughput 5 can be assigned to combine harvester 2.

In the exemplary embodiment shown, threshing parts 6, separating device 9 and cleaning device 15 simultaneously represent working units 31 of combine harvester 2. In addition, combine harvester 2 has a large number of actuators 32, although only adjusting drive 33 for sieve system 16, 17 of cleaning device 15 is described in the context of the present invention. In a manner known per se, adjusting drive 33 of cleaning device 15 is driven by at least one electrically driven adjusting motor 34, which brings about—via mechanical interface elements 35—an adjustment of opening width 36 of sieve lamella 37 of sieve system 16, 17, position sensors 38 known per se monitoring the position of adjusting drive 33. As a measure of the sieve opening width 36 to be set, either the position of sieve lamella 37, the position of spindle 39 of linear motor 34 and/or the position of one or more interface elements 35 of adjusting drive 33 can be sensed directly by position sensors 38.

Furthermore, agricultural working machine 1 designed as combine harvester 2 has a bus system 40—indicated schematically in FIG. 1 and to be described in greater detail, below—in which, in addition to sensors 25-28, 30, 38 described, a control and regulating unit 41 can be integrated, which can be edited by the operator 44 using a display and input unit 43 located in driver's cab 42 of combine harvester 2 and which displays information to the operator.

Figure 2:
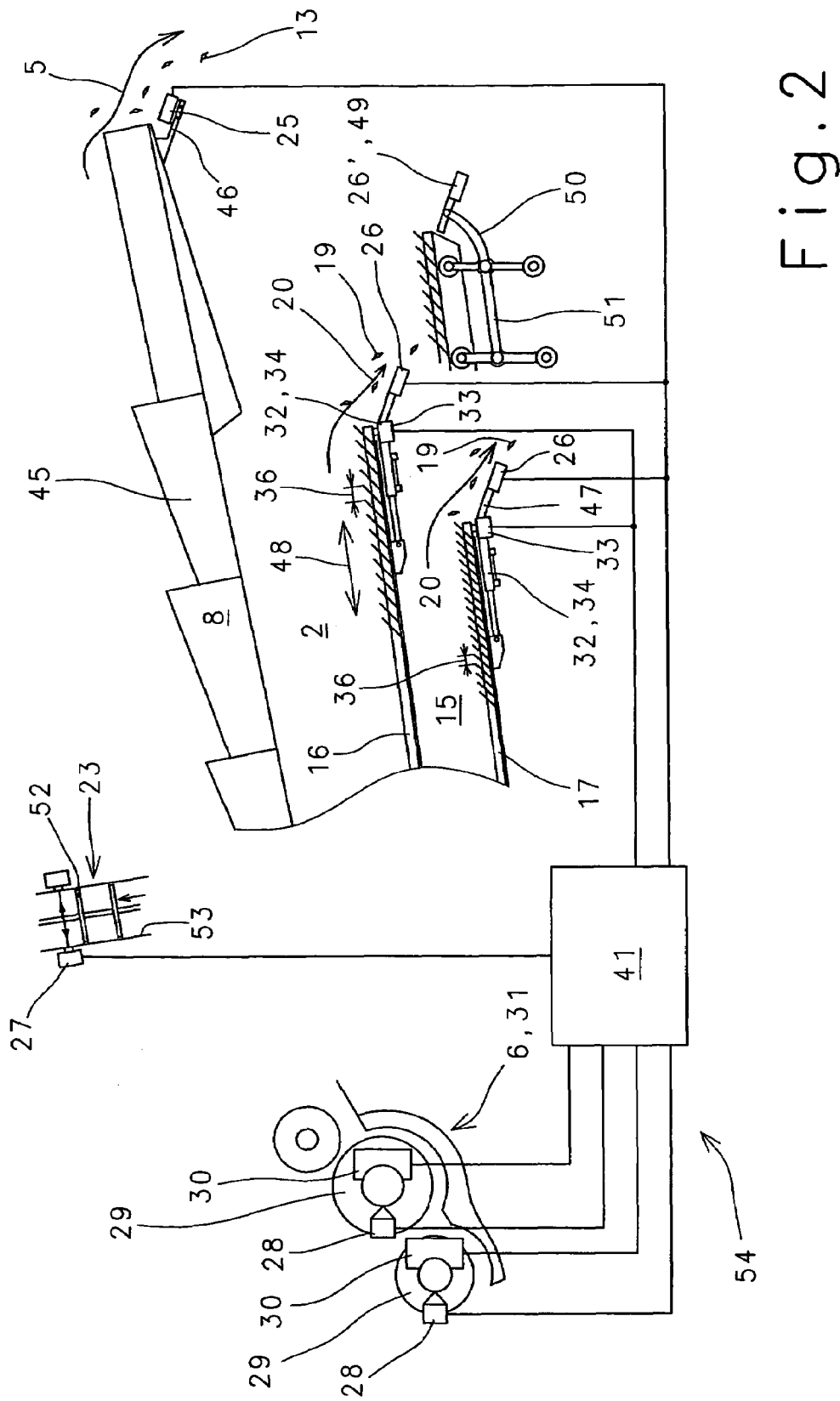
FIG. 2 shows a detailed view of the combine harvester in FIG. 1

FIG. 2 shows, for sensors 25-28, 30, 38 described as an example, their attachment to various working units 31 or actuators 32. Grain-loss sensors 25 that sense loss due to separation 13 are detachably connected to individual trays 45 of tray-type shaker 8 using retaining brackets 46. Due to the fact that individual trays 45 move in a manner such that they are offset from each other, it is advantageous to assign a separate grain-loss sensor 25 to each straw walker rack 45. A plurality of grain-loss sensors 25 can also be assigned to each straw walker rack to improve the measuring accuracy of each straw walker rack. In a similar manner, in the exemplary embodiment shown, in a first embodiment, separate grain-loss sensors 26 for determining losses due to cleaning 19 are assigned to upper sieve 16 and lower sieve 17 of cleaning device 15.

Grain-loss sensors 26 are also attached via retaining brackets 47 to particular sieve 16, 17 and therefore also perform the swinging motion 48 of particular cleaning sieve 16, 17. To improve the sensing accuracy, a large number of grain-loss sensors 26 can be assigned to each cleaning sieve 16, 17 across the width of cleaning sieve 16, 17. In a second embodiment, a single grain-loss sensor system 49 can be assigned to cleaning device 15, which accommodates a large number of grain-loss sensors 26' and is coupled either via an adapting device 50 with a swing frame 51 of sieve system 16, 17 and therefore reproduces swing motion 48 of cleaning sieves 16, 17 or is fixed directly to the frame in combine harvester 2. Since sieve opening width 36 is usually adjustable for upper sieve 16 and lower sieve 17 independently of each other, a separate adjusting drive 33 is mounted to each cleaning sieve 16, 17 to change sieve opening width 36.

In the exemplary embodiment shown, grain elevator 23 also has a grain-quantity sensor 27 known per se, which is either moved together with corn-lifting paddle 52 of grain elevator 23 or is located in a fixed position in a siding region 53 of grain elevator 23.

As indicated previously, rotational speed sensors 28 and torque sensors 30 known per se are assigned to cylinders 29 of threshing part 6. To realize data generation and transmission system 54 according to the present invention and described below, rotational-speed sensors 28 and torque sensors 30 can be connected either in a non-rotatable manner with rotating cylinders 29 or fixed to the frame of combine harvester 2.

Figure 3A:
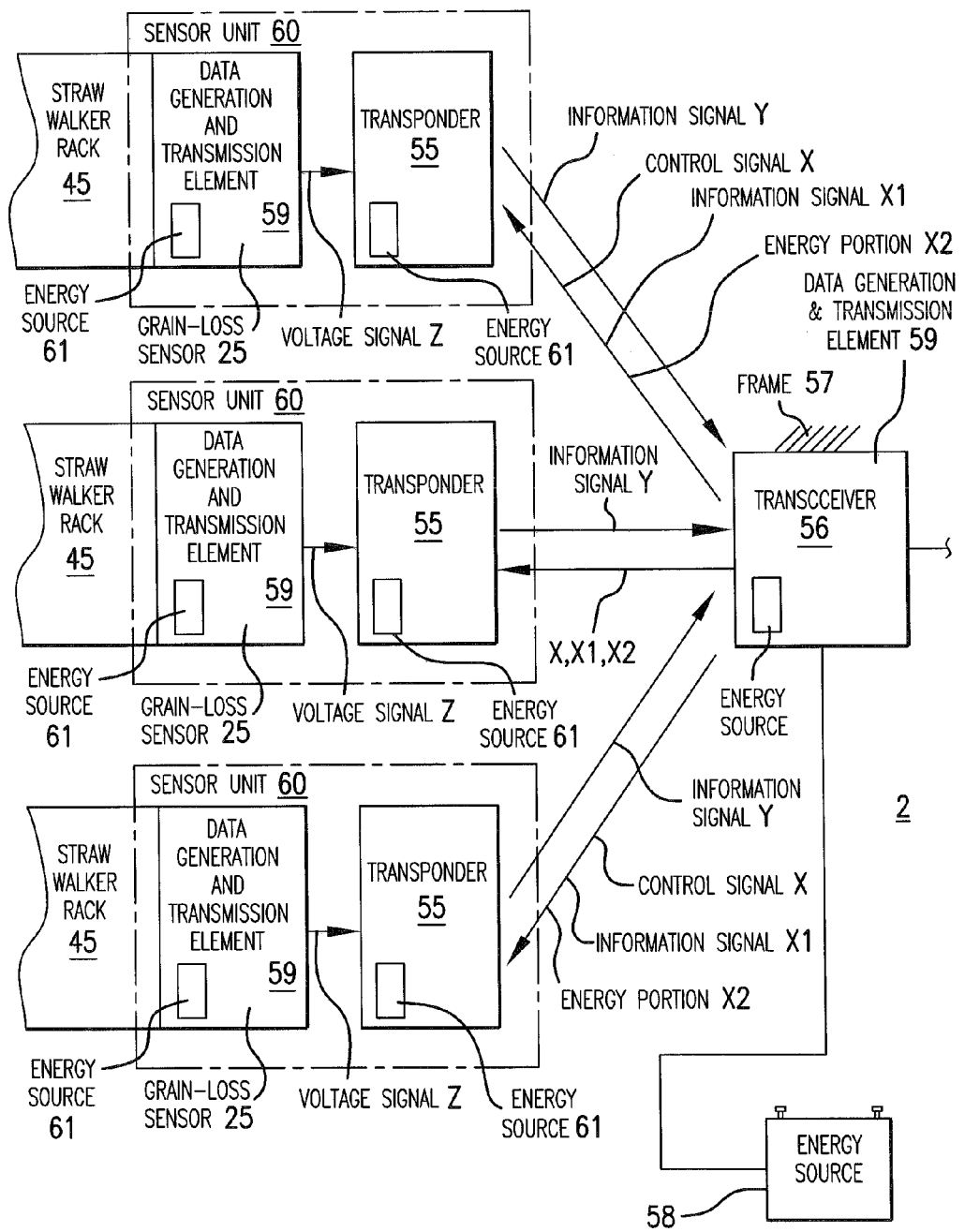
FIG. 3 shows a schematic depiction of the data generation and transmission system according to the present invention
Figure 3B:
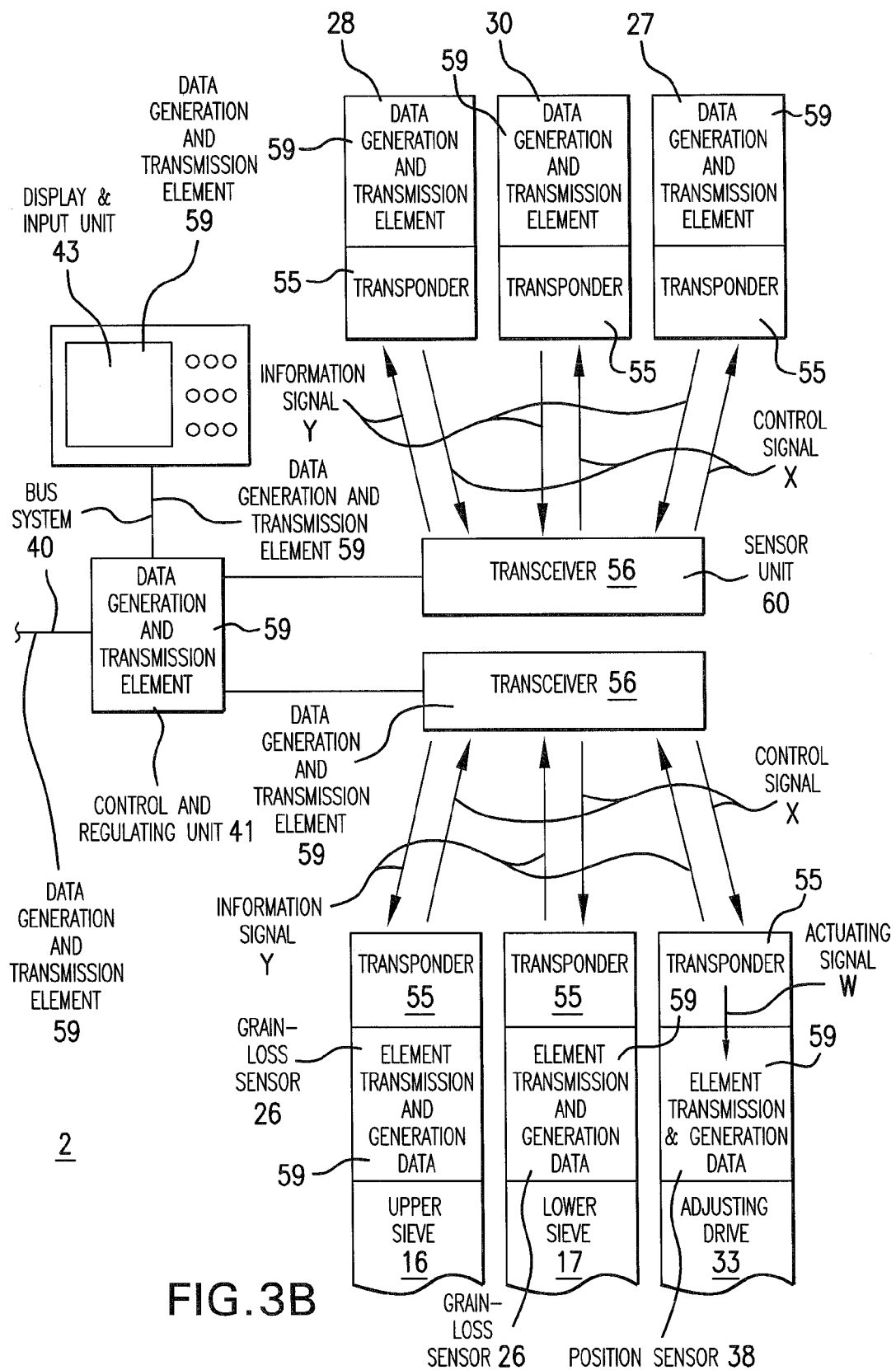

With reference to FIG. 3, data generation and transmission system 54 according to the present invention will now be described schematically using the example of grain-loss sensors 25 of tray-type shaker 8. One or more grain-loss sensors 25 are assigned to straw walker rack 45, which are designed as knock sensors in a manner known per se and that generate a voltage signal Z that is proportional to the grain loss as a function of the intensity of contact with grains representing loss due to separation 13. Voltage signal Z is transmitted to a transponder 55, which usually compiles voltage signal Z in a data format that can be processed further, and ultimately transfers it as an information signal Y to a transceiver 56 in a wireless manner according to the present invention. While grain-loss sensors 25 and transponders 55 assigned to them are connected with particular straw walker rack 45, transceiver 56 is connected fixedly to the frame, e.g., with frame 57 of combine harvester 2.

Transceiver 56 is designed such that it transmits information signals Y received via, e.g., a bus system 40 integrated in combine harvester 2 to a control and regulating unit 41 that communicates via bus system 40 with display and input unit 43 described above. Transceiver 56 can also wirelessly transmit control signals X to transponders 55 of various grain-loss sensors 25. Control signals X can include information X1 for transponders 55 and grain sensors 25 assigned to them, such as calibration information, and energy components X2 required to operate grain-loss sensors 25 and transponders 55. In the simplest case, energy component X2 transmitted by transceiver 56 can be obtained from an energy source 58 assigned to the combine harvester.

Due to the fact that at least the data transmission between transponders 55 of grain-loss sensors 25 and transceiver 56 takes place in a wireless manner, and transceiver 56 simultaneously transmits energy X2 required to operate grain-loss sensors 25 and transponders 55 assigned to them, a data generation and transmission system 54 is created, with which the data transmission is flexibly adaptable to geometric circumstances and that functions independently of separate energy sources assigned directly to individual grain-loss sensors 25 or transponders 55.

In a similar manner, grain-loss sensors 26 of cleaning device 15 and position sensor(s) 38 of adjusting drives 33 assigned to cleaning sieves 16, 17 can communicate wirelessly via transponders 55 with the same or a separate transceiver 56 in the manner described previously, further transceiver 56 also being integrated in bus system 40 of combine harvester 2. Provided it relates to adjusting drive 33, transponder 55 ultimately generates an actuating signal W that brings about the above-described adjustment of sieve opening width 36 of sieve system 16, 17. In addition, grain-flow sensor 27 and rotational speed and torque sensors 28, 30 are connected via further transponders 55 with an existing or, as shown, a separate transceiver 56 to bus system 40 of combine harvester 2.

In the exemplary embodiment shown, at least various sensors 25-28, 30, 38 and transceiver 56 are the data generation and transmission elements 59 that exchange data in a wireless manner according to the present invention.

To realize a less susceptible design, particular sensors 25-28, 30, 38 and transponders 55 assigned to them can be combined in one component to form one sensor unit 60.

Figure 4:
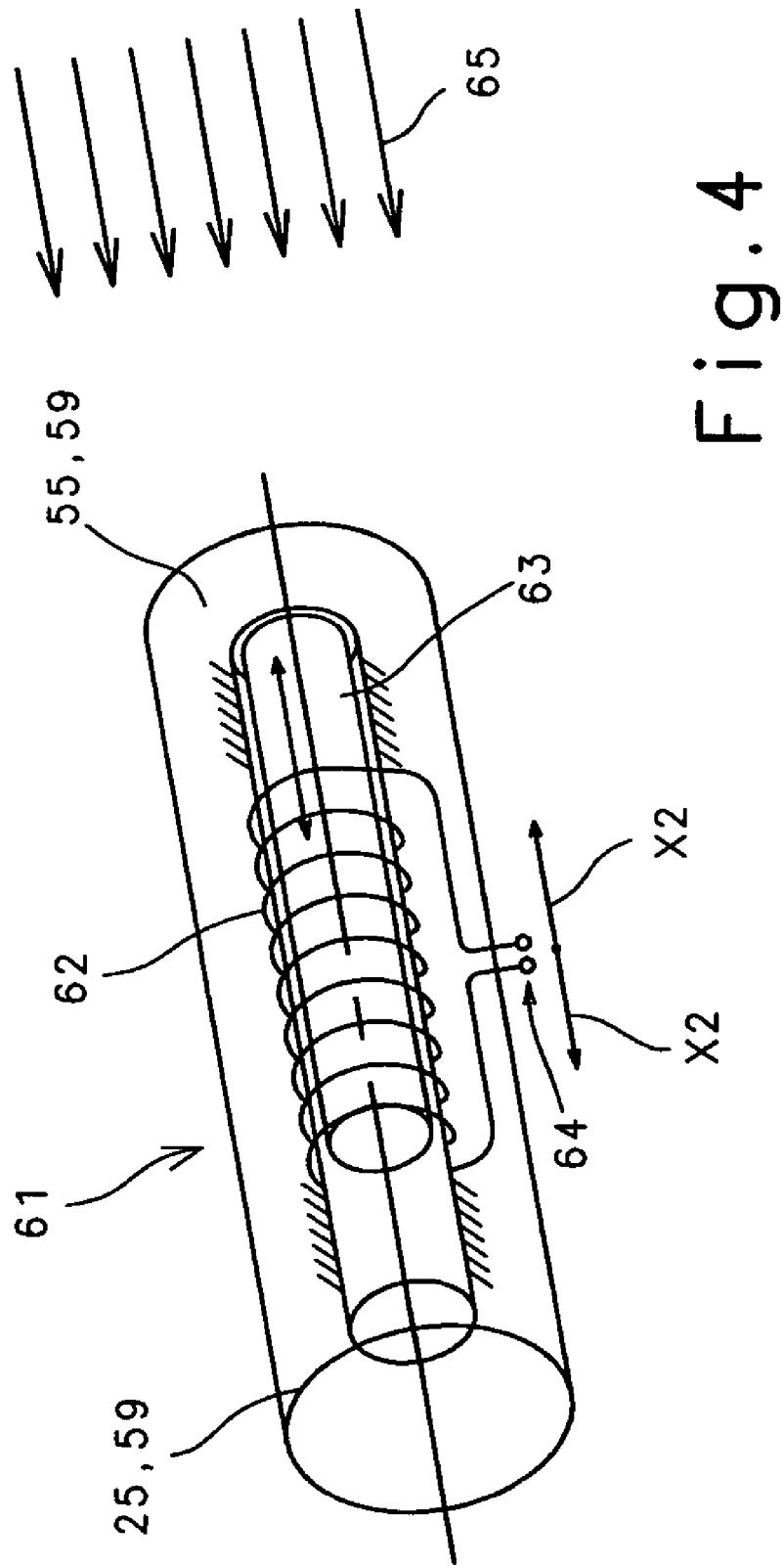
FIG. 4 shows a detailed view of a sensor according to the present invention

Provided various sensors 25-28, 30, 38, transponders 55 assigned to them, and the transceiver(s) are in motion during their communication, energy sources 61 to be described in greater detail generate—from the particular kinetic energy—the energy X2 required to operate various data generation and transmission elements 59 can also be assigned to these data generation and transmission elements 59. For reasons of transparency, this exemplary embodiment is shown in FIG. 3 only for one sensor-transponder-transceiver system 25, 55, 56. FIG. 4 shows energy source 61 in detail. An inductance coil 62 composed of any number of windings is assigned to the interior of sensor unit 61 which is moved during operation, a slidingly mounted permanent magnet 63 being positioned inside inductance coil 62, permanent magnet 63 sliding inside inductance coil 62 as a result of the motion of sensor unit 61, so that a voltage is induced in inductance coil 62 in a manner known per se. At one end, contacts 64 are assigned to inductance coil 62, via which the induced voltage is tapped and, after transformation, is directed to particular sensor 25-28, 30, 38 and transponder 55 assigned to this, as energy X2. It is within the scope of the present invention, in place of permanent magnet 63 located in sensor unit 61 in a sliding manner, for sensor unit 61 itself to be movable within a magnetic field 65 generated externally, thereby greatly simplifying the design of sensor unit 61.

One skilled in the art is capable of transforming data generation and communication system 54 described in a manner not shown or to use it in applications other than those shown here to obtain the effects described, without leaving the scope of the invention.

It will be understood that each of the elements described above, or two or more together, may also find a useful application in other types of constructions differing from the types described above.

While the invention has been illustrated and described as embodied in a data generation and transmission system in agricultural working machines, it is not intended to be limited to the details shown, since various modifications and structural changes may be made without departing in any way from the spirit of the present invention.

Without further analysis, the foregoing will reveal fully reveal the gist of the present invention that others can, by applying current knowledge, readily adapt it for various applications without omitting features that, from the standpoint of prior art, fairly constitute essential characteristics of the generic or specific aspects of the invention.

What is claimed as new and desired to be protected by Letters Patent is set forth in the appended claims.

The invention claimed is:

1. A data generation and transmission system in agricultural working machines for exchanging data between working units selected from the group consisting of mobile working units, stationary working units, and both, and actuators, the data generation and transmission system comprising data generation and transmission elements assignable to at least a portion of the working units, at least a portion of said data generation and transmission elements enabling wireless exchange of data, and an energy required for dealing with the data selected from the group consisting of generating the data, transmitting the data, and both, being associated with the data generation and transmission system in a manner selected from the group consisting of producing the data in the data generation and transmission system, transmitting the data by the data generation and transmission system, and both.

2. A data generation and transmission system as defined in claim 1; and further comprising transponders with at least one transceiver mounted on a frame; and sensors assigned to elements selected from the group consisting of said working units, said actuators, and both, and exchanging data via said transponders with said at least one receiver mounted on said frame.

3. A data generation and transmission system as defined in claim 2, wherein said sensors, said transponders and said transceiver are arranged so that said sensors transmit voltage signals to particular one of said transponders, which said particular transponder processes the voltage signals further and transmits them as information signals to said at least one transceiver, and said transceiver transmits said information signals to downstream data generator and transmission elements and said control signals to said sensors and said transponders.

4. A data generation and transmission system as defined in claim 2, wherein one of said transponders is assigned to each of said sensors, and a number of said transponders communicates with a same one of said transceivers.

5. A data generation and transmission system as defined in claim 4, wherein one of said sensors and one of said transponders assigned to said one sensors are combined to form a sensor unit.

6. A data generation and transmission system as defined in claim 4, wherein a number of said sensors and a number of said transponders assigned to said number of said sensors are combined into groups of said data generation and transmission elements, and each of said groups communicates with a separate one of said transceivers.

7. A data generation and transmission system as defined in claim 2; and further comprising an element selected from the group consisting of a control and evaluation unit, a bus system, and both of the agricultural working machine, said at least one transceiver communicating with at least one of said elements.

8. A data generation and transmission system as defined in claim 2; and further comprising an energy source provided for a data exchange and formed by an element selected from the group consisting of a system including said sensors and said transponders, at least one transceiver, and both.

9. A data generation and transmission system as defined in claim 2, wherein said at least one transceiver is configured to produce a control signal from which the energy for operating a system including said sensors and said transponders is obtained.

10. A data generation and transmission system as defined in claim 2, wherein the data generation and transmission system is configured so that the energy for operating an element selected from the group consisting of a system including said sensors and said transponders, said at least one transceiver, and both is generated by external magnetic fields.

11. A data generation and transmission system as defined in claim 2, wherein a system including said sensors and said transponders is movably located; and further comprising a pendulum-inductance coil system provided for producing the energy and located in said system including said sensors and said transponders.

12. A data generation and transmission system as defined in claim 11, wherein said pendulum-inductance coil system has a pendulum which is designed as a permanent magnet that is slideably mounted in an inductance coil.

13. A data generation and transmission system as defined in claim 12, wherein said pendulum-inductance coil system is located in an element selected from the group consisting of a sensor unit which includes at least one of said sensors and at least one of said transponders, at least one of said sensors, at least one of said transponders, and combinations thereof.

14. A data generation and transmission system as defined in claim 2, wherein said at least one transceiver is located in a fixed position on said machine frame, and at least one of systems including one of said sensors and one of said transponders is assigned to said elements selected from the group consisting of said mobile working units, said actuators, and both of the agricultural working machine.

15. A data generation and transmission system as defined in claim 2, wherein said sensors are configured so as to generate signals selected from the group consisting of measured signals, actuating signals, and both.

16. A data generation and transmission system as defined in claim 2, wherein the agricultural working machine is a combine harvester, said sensors being configured as grain-loss sensors and assigned to elements selected from the group consisting of tray-type shakers, a cleaning device, and both, of the combine harvester.

17. A data generation and transmission system as defined in claim 2, wherein the agricultural working machine is configured as a combine harvester, said sensors being configured as sensors selected from the group consisting of air-speed sensors, humidity sensors, temperature sensors, and combinations thereof, and said sensors being assigned to at least one of said working units.

18. A data generation and transmission system as defined in claim 2, wherein the agricultural working machine is configured as a combine harvester, said sensors being configured as a position sensors for an adjusting drive of a sieve of a cleaning device of the combine harvester.

19. A data generation and transmission system as defined in claim 2, wherein the agricultural working machine is configured as a combine harvester, said sensors being configured as grain-quantity sensors and integrated in an element selected from the group consisting of a grain elevator, a siding of the grain elevator, and both of the combine harvester.

20. A data generation and transmission system as defined in claim 2, wherein the agricultural working machine is configured as a combine harvester, said sensors being configured as sensors selected from the group consisting of speed sensors, torque sensors, and both, and being assigned to threshing parts of the combine harvester.

* * * * *